United States Patent
Helms

(10) Patent No.: US 7,854,538 B2
(45) Date of Patent: Dec. 21, 2010

(54) HIGH INTENSITY TACTICAL VEHICLE INFRARED AND WHITE HEADLIGHT SYSTEM

(75) Inventor: James M. Helms, Mars, PA (US)

(73) Assignee: Ibis Tek, LLC, Butler, PA (US)

( * ) Notice: Subject to any disclaimer, the term of this patent is extended or adjusted under 35 U.S.C. 154(b) by 290 days.

(21) Appl. No.: 12/284,411

(22) Filed: Sep. 22, 2008

(65) Prior Publication Data

US 2009/0116258 A1 May 7, 2009

Related U.S. Application Data

(60) Provisional application No. 60/998,039, filed on Oct. 4, 2007.

(51) Int. Cl.
*F21S 8/10* (2006.01)
*F21V 7/00* (2006.01)

(52) U.S. Cl. ............... 362/545; 362/228; 362/543; 362/544; 362/538; 362/249.05
(58) Field of Classification Search ............... 362/228, 362/538, 543–545, 249.05
See application file for complete search history.

(56) References Cited

U.S. PATENT DOCUMENTS

| 7,540,638 B2 * | 6/2009 | Dassanayake et al. ....... 362/465 |
| 2009/0200496 A1 * | 8/2009 | Barie et al. ............... 250/495.1 |

* cited by examiner

*Primary Examiner*—Stephen F Husar
*Assistant Examiner*—James W Cranson
(74) *Attorney, Agent, or Firm*—Karen Tang-Wai Sodini

(57) ABSTRACT

A headlamp for a vehicle or other application, including a circular arrangement of groupings of IR LEDs in a retaining ring, each grouping of IR LED providing a different beam pattern of infrared illumination, and a HID lamp surrounded by the retaining ring, for providing visible light. A switch system is also provided, for enabling either the visible light or the infrared light, and for selecting a beam pattern.

10 Claims, 6 Drawing Sheets

HIGH INTENSITY TACTICAL VEHICLE INFRARED AND WHITE HEADLIGHT SYSTEM

CROSS REFERENCE TO RELATED APPLICATIONS

Reference is made to and priority claimed from U.S. provisional application Ser. No. 60/998,039, filed on Oct. 4, 2007.

FIELD OF THE INVENTION

The present invention pertains to the field of electric illumination. More particularly, the present invention pertains to the field of electric lights with variable beam settings that make use of combinations of High Intensity Discharge (HID) lamps, providing (apparently) white (visible) light, and infrared (IR) light-emitting diodes (LEDs) for use in motorized vehicles, including tactical military vehicles.

BACKGROUND OF THE INVENTION

Sealed beam headlights that have been deployed with tactical vehicles for many years have poor performance characteristics compared with today's automotive lighting systems. A common headlamp in tactical vehicles is an incandescent, sealed beam headlamp containing two filaments, one for high beam and one for low. These headlamps produce on average up to 75,000 cd (candela), and 100 m visibility at 2 lx (lux). The color temperature for incandescent headlamps is about 3000 K, giving the light a warm yellowish appearance.

Halogen headlamps are a significant improvement over incandescent bulbs, producing more lumens per watt. This means that more light can be produced with the same amount of power. Most halogen lights can reach a luminous intensity of approximately 150,000 cd. Halogen headlamps operate at much higher temperatures than incandescent bulbs, increasing the chance of headlamp lens breakage and heat damage to the lamp housing.

HID (high intensity discharge) headlamps (using typically a xenon gas) are the latest technology in automotive lighting systems. Like halogen headlamps, HID headlamps consume less power than incandescent headlamps and have a luminous intensity even greater than halogens, approximately 200,000 cd. The color temperature of an HID light is in the range of 5000 K, similar to daylight. The average lifespan of an HID bulb is 2000 hours, roughly 5 times longer than a standard incandescent headlamp. HID headlamps work by producing an electric arc through a gas (typically xenon for automotive applications). A small lighting ballast is required to produce the arc when used with automotive voltages. (A lighting ballast is a piece of equipment required to control the starting and operating voltages of electrical gas discharge lights, such as HID lamps, and also fluorescent and neon lights. The term lighting ballast for a light can refer to any component of a circuit intended to limit the flow of current through the light, from a single resistor to more complex devices.)

Military "blackout" operations present even greater challenges: operating a vehicle at night, at moderately high speed, without being detected by enemy forces. Traditional blackout lights that have been deployed on tactical vehicles provide a very small amount of visible light illumination directly in front of the vehicle bumper. Many operators consider this to be ineffective especially when driving at higher speeds.

Night vision goggles (NVGs) along with infrared lighting have significantly improved low-light and blackout operations. NVGs used without providing any sort of illumination are, however, generally considered inadequate for such operations.

It is generally considered to be highly advantageous to provide infrared (IR) illumination in a field of view, instead of relying on infrared produced by objects in the field of view. IR illumination of a field of view is a great help in blackout operations, dramatically increasing the effectiveness of even lower-performing NVGs. IR illumination is often produced from an incandescent lamp using a blackout filter/lens that passes only IR radiation from the incandescent lamp. Producing IR illumination in this way, though, is inefficient, since the lamp still produces visible light too, and only a small portion of the radiation produced by the lamp is passed as IR. In addition, it is difficult to block all visible light, and further, the filter/lens must be mechanically moved into place, which results in what is often an unacceptable conversion time to switch between visible and infrared illumination mode.

What is needed then is a lamp that provides both visible light and also IR illumination, both of sufficient intensity for vehicle operation (at night) at reasonable speeds, but without generating so much heat that heat dissipation is problematic, and also that switches from visible light to IR in an acceptable time.

SUMMARY

The invention provides a (substantially) white light and infrared light headlight system for military and/or security vehicles using a combination of high intensity discharge (HID) lamps and light emitting diodes (LEDs) to produce variable beam settings.

BRIEF DESCRIPTION OF THE DRAWINGS

The above and other objects, features and advantages of the invention will become apparent from a consideration of the subsequent detailed description presented in connection with accompanying drawings, in which.

DRAWINGS LIST OF REFERENCE NUMERALS

Figure 1:
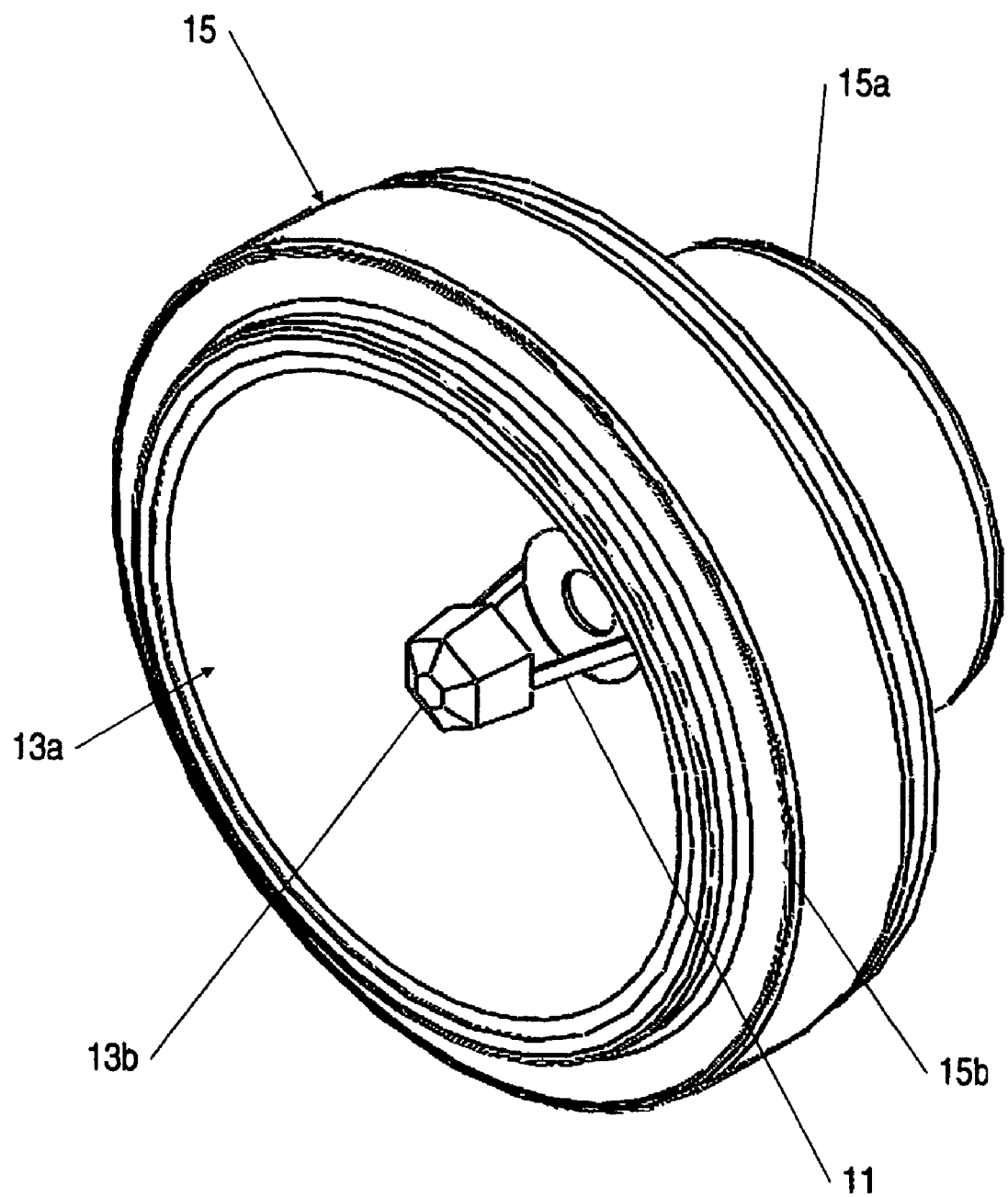
FIG. 1 is a perspective drawing of one of two headlamps of a high intensity tactical vehicle infrared (HITIR) and (substantially) white headlight system according to the invention, the headlamp including IR LEDs in a retaining ring surrounding a high intensity discharge (HID) light between two reflector structures.

The following is a list of reference labels used in the drawings to label components of different embodiments of the invention, and the names of the indicated components.

11 HID light
11*a* reflector structure
11*b* HID gas chambers
12 retaining ring
13*a* base reflector structure
13*b* forward reflector structure 14 IR LEDs
15 headlamp housing (or headlight "can", i.e. canister)
15a base component
15b top component
16 ballast assembly

DETAILED DESCRIPTION

The invention provides a headlamp that is one of two headlamps forming what is here called a high intensity tactical vehicle infrared (HITIR) (light) and white (light) headlight system.

Figure 2:
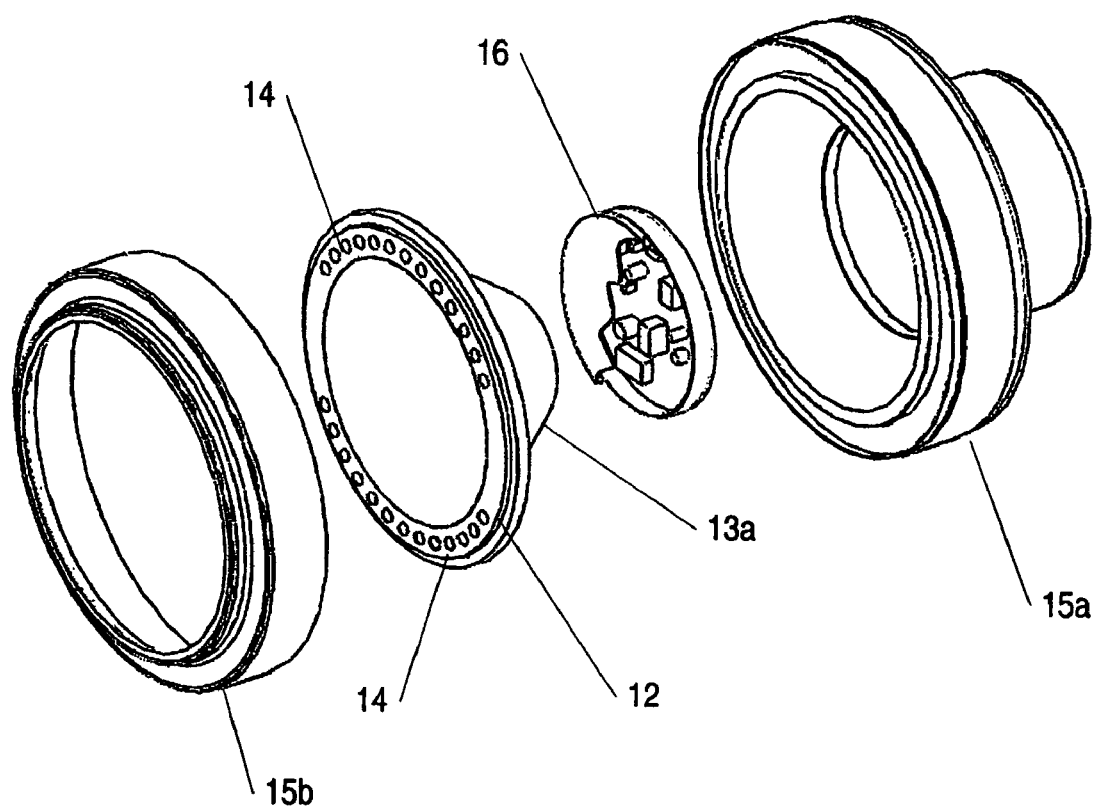
FIG. 2 is an exploded view of the headlamp of FIG. 1.
Figure 3:
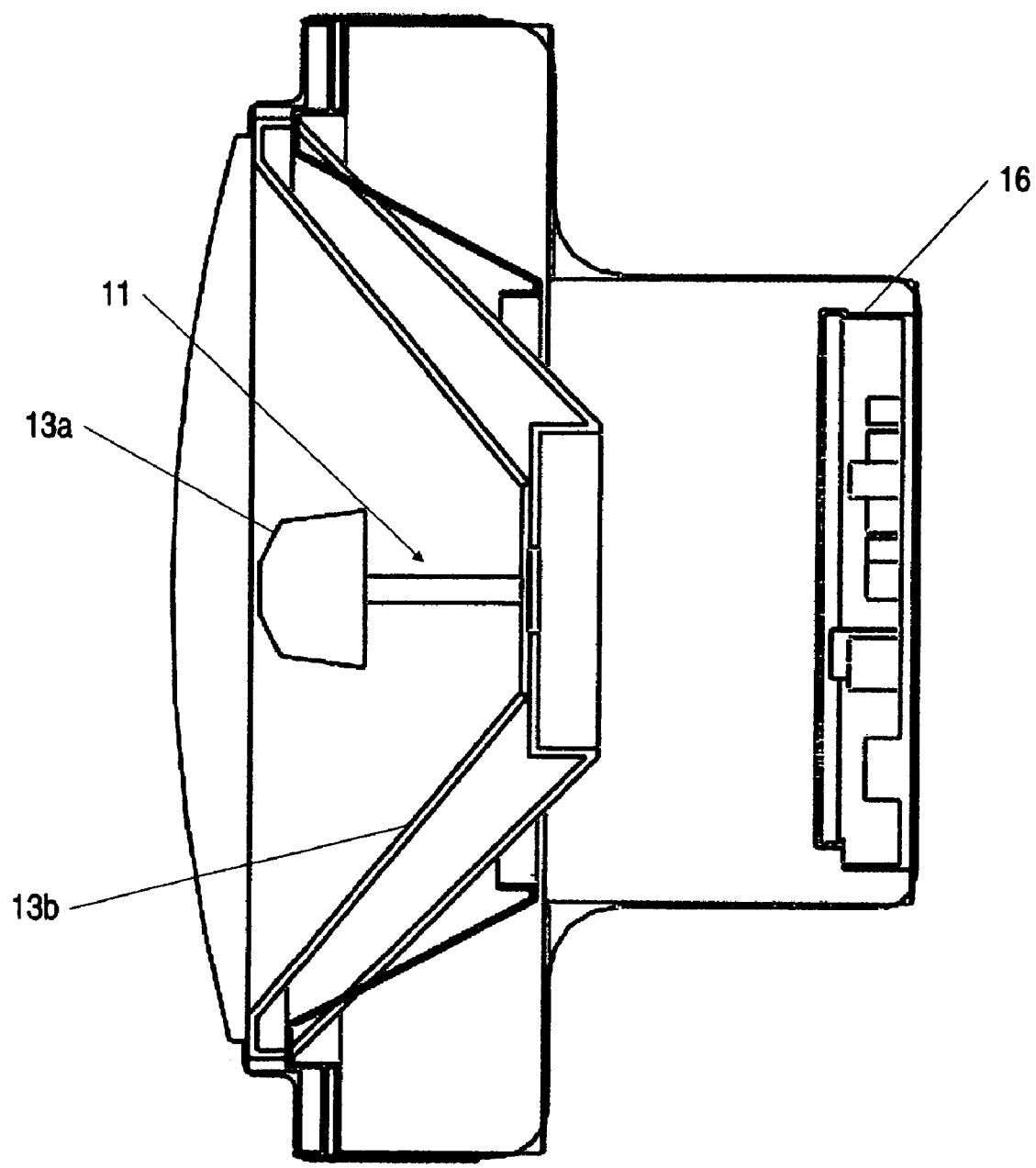
FIG. 3 is a cut away view of the HID light and reflector structures of FIGS. 1 and 2.
Figure 4:
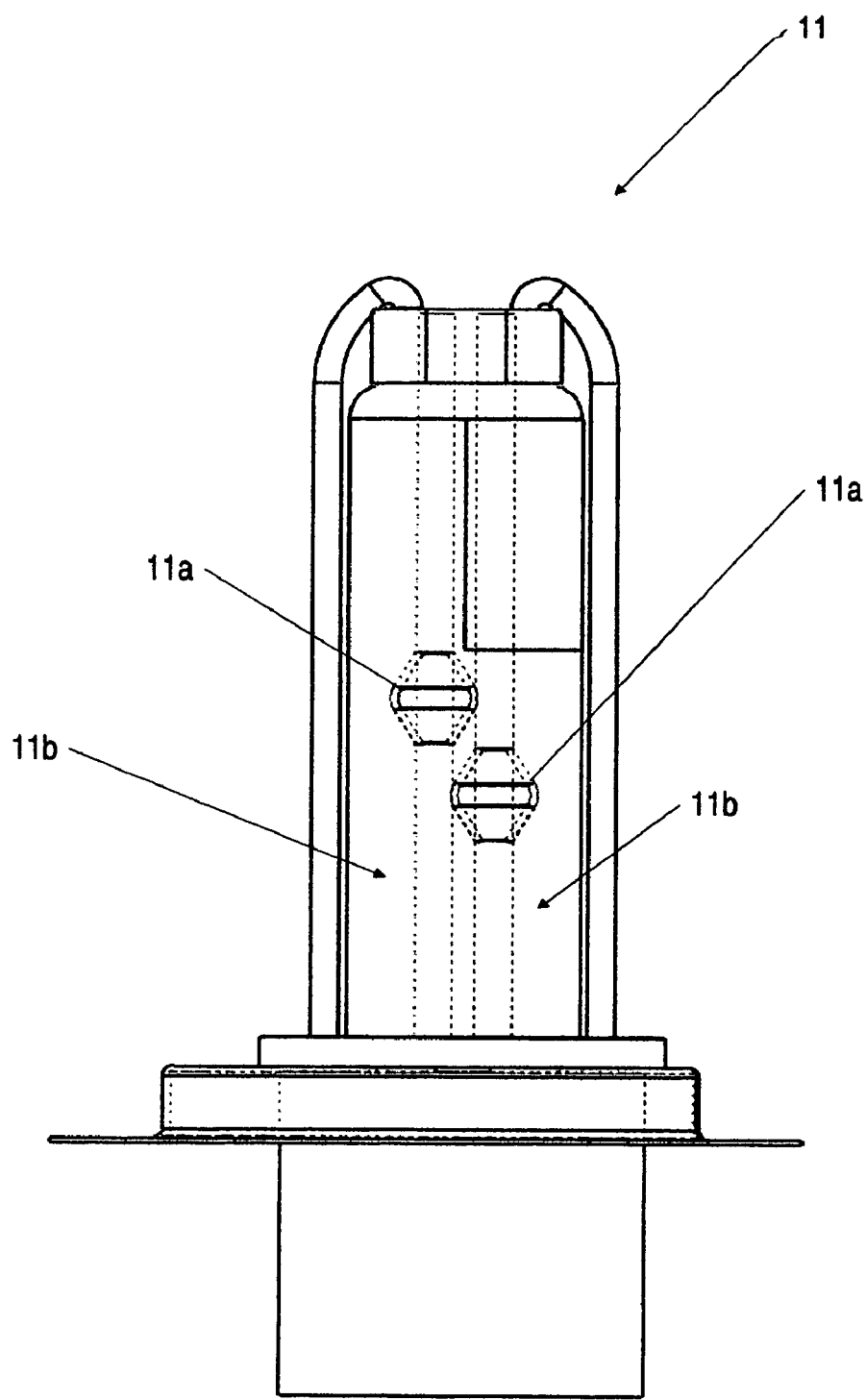
FIG. 4 is a perspective drawing of the HID light bulb of the HID light of FIG. 1, showing two HID gas chambers in a single bulb.
Figure 5:
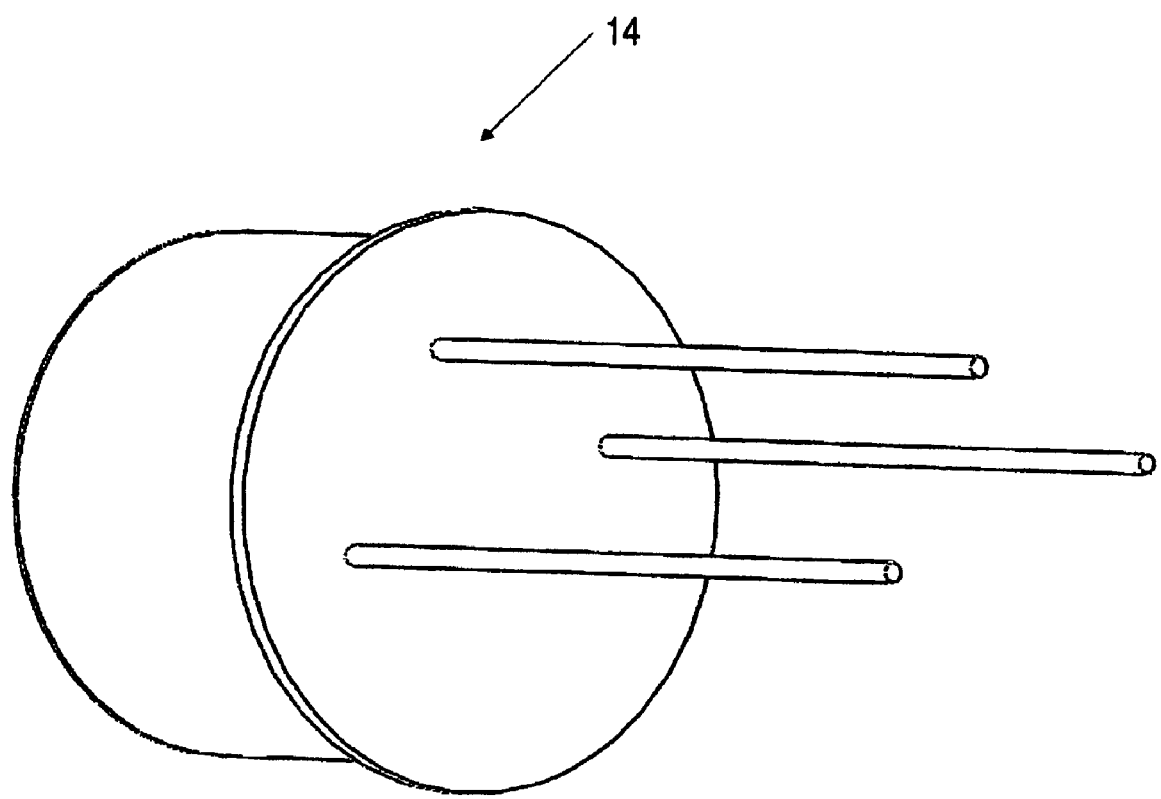
FIG. 5 is a perspective drawing of an IR LED used by the invention in some embodiments.
Figure 6:
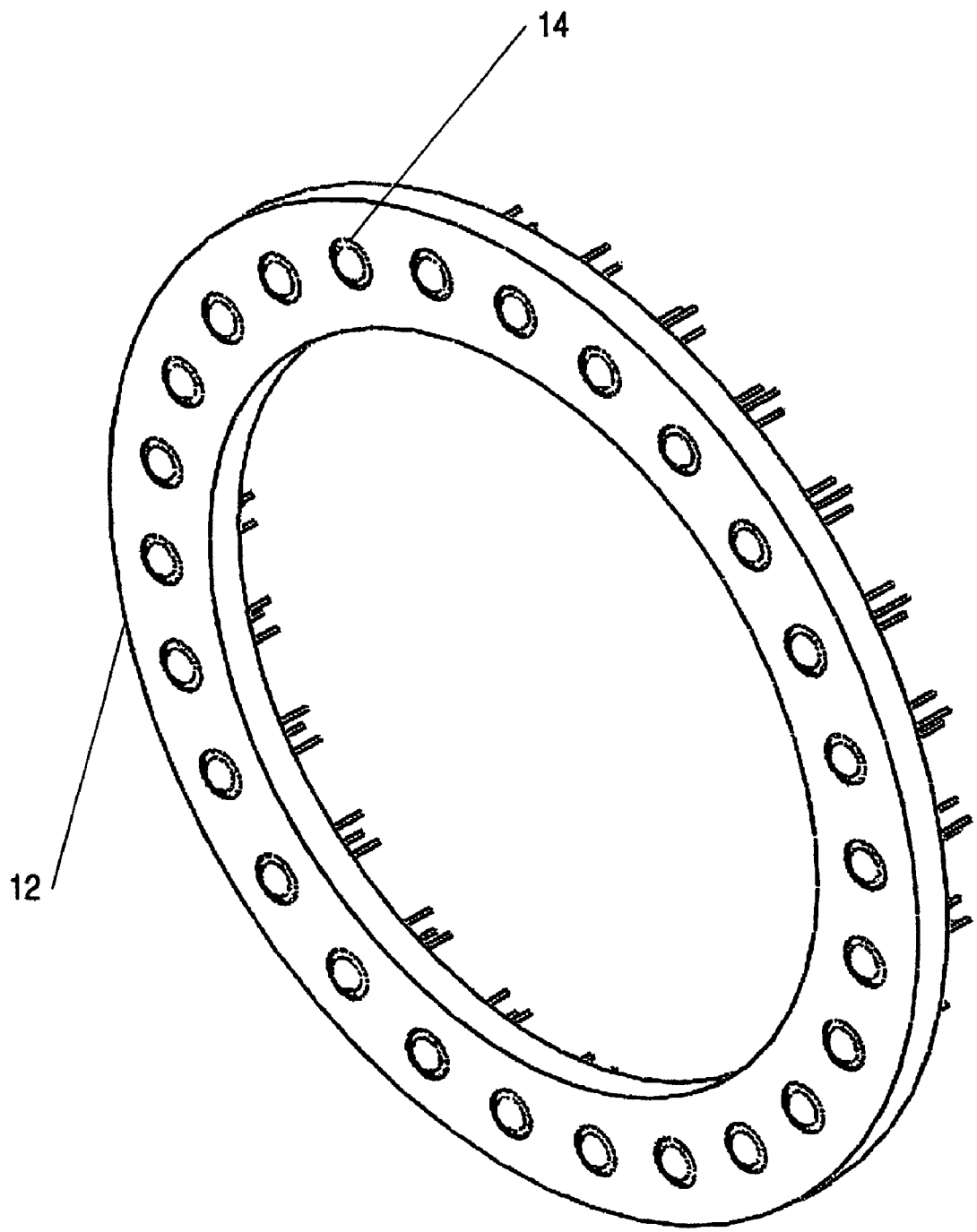
FIG. 6 is a perspective drawing of the retaining ring shown in FIGS. 1 and 2.

As shown in FIGS. 1-6, a headlamp according to one embodiment of the invention includes an HID light 11 providing white lighting and disposed between a base reflector structure 13a and a forward reflector structure 13b, and surrounded by and attached to a retaining ring 12 (via the base reflector structure 13a) holding a number of IR LEDs 14 (26 in the embodiment shown) for IR illumination, all included in the same headlamp housing 15, which housing includes a base component 15a and a top component 15b. The term "white" in connection with lighting is meant here to indicate light that is apparently white, i.e. not obviously colored, but the term is not meant to indicate any particular spectrum of light.

The headlamp also includes a ballast 16 for the HID (FIG. 2), for providing proper operating voltage and current. A circuit board (not shown) providing current-limiting for the IR LEDs 14 is advantageously provided on the back face of the retaining ring 12 (so that the circuit board is not visible when looking at the front of the headlamp). The integrated system is typically configured to operate on 24 volts, which is common for military vehicle headlamps. The retaining ring 12 not only holds the IR LEDs 14 in place, but also conducts heat from the IR LEDs to the headlight housing ("can"), and out to the rest of the vehicle.

The headlight housing 15 is advantageously the same as used on the HMMWV (High Mobility Multipurpose Wheeled Vehicle) and other tactical vehicles. By using such a headlight can, the factory mounting provisions currently being used can continue to be utilized; the seven-inch incandescent lamp that is currently used in the headlight can be replaced with the HITIR and white headlight system of the invention. In an advantageous embodiment, the HID white headlight is comprised of a 5-inch lens (HID lamp bulb enclosure) that will allow space for the IR LED lighting system around the perimeter, and still fit in the same space as the seven-inch incandescent.

In one embodiment, a total of 26 IR LEDs are utilized, 13 IR LEDs for low-beam operation with an additional 13 IR LEDs for high-beam operation, so that all 26 LEDs are used in high-beam operation. Desired high and low IR beam patterns are achieved by adjusting the IR LED surface mounting angle, utilizing different angles for high-beam and low-beam operation.

The IR LEDs are advantageously high-power gallium aluminum arsenide (GaAlAs) emitters. An exemplary IR LED is provided by Opto Diode Corporation of Newbury Park, Calif., as product number OD-50L. Each emitter is self-contained in a hermetic package with a total of three electrical connection leads, two cathodes (externally connected) and one anode. Inside the IR LED packaging is a 0.30-inch square semiconductor chip that forms a P-N junction. When this circuit is forward biased, it converts electrical current to photons at a wavelength in the infrared range, and more specifically, at about 880 nm. In one embodiment, the total power output for each IR LED is 50 mW (before any degradation), using 500 mA current draw. Other embodiments provide for higher power output for each IR LED. A total of 26 IR LEDs are advantageously used, 13 of these IR LEDs for low-beam operation, and all 26 of these IR LEDs for high beam operation. The 13 LEDs for low beam provide a 120-degree beam pattern, and the other 13 LEDs provide a 7-degree beam pattern. The HITIR and white headlight system of the invention is advantageously configured so that all IR LEDs can be turned on at the same time, providing both the 120-degree and the 7-degree beam pattern.

The white HID light 11 may also include high-beam and low-beam functionality. To achieve this, the HID light bulb may contain two HID gas chambers 11b (FIG. 4), and two corresponding HID ballasts, advantageously on a single ballast assembly 16. Each HID gas chamber and ballast acts as a separate filament to provide a high or low beam. Differing beam patterns are produced because the HID bulb gas chambers are physically located at different distances in the focal plane of the reflector structures 11a, providing different high-beam and low-beam patterns.

A headlamp according to the invention can advantageously be provided to be installed as an original headlamp or as a replacement part on tactical military vehicles using the same vehicle wiring harnesses and headlamp mounting provisions as are now used for the incandescent lamp now installed. The headlamp can be configured so that the same vehicle headlight switch, high beam switch, and infrared light switch continue to be utilized. Further, any military headlight switch can be used to control this system as the master control switch; there is no need to modify or replace the existing switch. Only one wire is required to be run from the infrared light switch wiring harness to the HITIR and white headlight system. This wire plugs directly into the infrared switch wiring harness; therefore no modification to the wiring harness itself is necessary. In total, four wires will connect to each headlamp assembly: the three original wires for high beam, low beam, and ground, with one additional wire from the infrared light switch to switch between white and infrared lighting.

The system is designed to be installed as a kit, by removing the original vehicle headlamp assemblies and replacing them with the HITIR and white headlight system assemblies of the invention. The same headlamp assembly mounting bolts are utilized along with the factory wiring harnesses. All major subsystems of the HITIR and white headlight system—the HID bulbs, IR assemblies, and HID ballasts/electronics—are field-replaceable units (i.e. they can be replaced by the operator, in the field, with no special tools).

Sample operating characteristics of an HITIR and white headlight system according to the invention are:

|  | Per headlight | Total ×2= |
| --- | --- | --- |
| Low Beam | | |
| HID | | |
| HID power | 35 W | 70 W |
| Volts In | 18-32 VDC | |
| Volt normal | 27 VDC | |
| Current Draw @ 24 vcd | 0.75 A | 1.5 A |
| IR LED's | | |
| Number of LED's | 13 | |
| Radiant Intensity | 2500 mW/sr | |

-continued

|  | Per headlight | Total ×2= |
|---|---|---|
| Total Power Output | 250 mW | 500 mW |
| Peak Emission Wavelength | 880 nm | |
| Volts In | 9-32 VDC | |
| Volt normal | 27 VDC | |
| Current Draw @ 24 vdc | 550 mA | 1.1 A |
| High Beam | | |
| HID | | |
| HID power | 35 W | 70 W |
| Volts In | 18-32 VDC | |
| Volt normal | 27 VDC | |
| Current Draw @ 24 vcd | 0.75 A | 1.5 A |
| IR LED's | | |
| Number of LED's | 26 | |
| Radiant Intensity | 2500 mW/sr | |
| Total Power Output | 250 mW | 500 mW |
| Peak Emission Wavelength | 880 nm | |
| Volts In | 9-32 VDC | |
| Volt normal | 27 VDC | |
| Current Draw @ 24 vdc | 550 mA | 1.1 A |

The operation of the HITIR and white headlight system in a typical embodiment is very much the same as current headlight and filtered incandescent infrared operations. The vehicle operator uses the factory vehicle headlight switch, infrared switch, and high beam/low beam selector switch. During normal operation, HID headlights are powered on and off with the factory headlight switch and high beams are operated using the factory high beam/low beam selector switch. For infrared operations, the factory installed infrared switch is turned on. The infrared switch determines whether white lighting or IR lighting is controlled by the headlight on/off switch and high beam/low beam selector switch. When the infrared light switch is in the on position, the white headlight system cannot be turned on, but if the headlight system is already powered on, the white light headlights automatically turn off and infrared lights on. Infrared high-beam and low-beam operation is still controlled by the factory high beam/low beam selector switch, as well as on and off controls. If the vehicle does not come with a factory infrared switch, a standard switch can be ordered and installed.

It should be understood that a single headlamp according to the invention could also be used as a handheld or mounted light for applications other than serving as a vehicle headlamp.

It is to be understood that the arrangements shown and described above and in the attachments are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A headlamp system comprising:
a housing (15) having a base component (15a) and a top component (15b) having a periphery, the top component affixed to and covering the base component;
a base reflector structure (13a) affixed inside the base component (15a);
a HID light (11) affixed inside the base reflector structure (13a);
a ballast (16) electrically connected to the HID light (11);
a plurality of IR LEDs (14), each IR LED providing a wide-angle beam, arranged in a wide-angle grouping around the periphery of the top component (15b);
a plurality of IR LEDs (14), each IR LED providing a narrow-angle beam, arranged in a narrow-angle grouping around the periphery of the top component (15b); and
one or more switches electrically configured and connected for controlling operation of the HID light and the IR LEDs;
wherein the one or more switches comprise a headlight switch for switching on and off the headlight, a high-beam switch for selecting a high beam or a low beam, and an infrared switch for switching between white light and infrared light.

2. The headlamp of claim 1, wherein the HID light (11) comprises two independently ballasted HID gas chambers (11b) in a single bulb, allowing for high and low beam operation of the HID light (11) by activating the one or more switches.

3. The headlamp of claim 1, wherein activating the one or more switches allows a headlamp user to turn on either the HID light (11) alone, the wide-angle grouping alone, the narrow-angle grouping alone, or the wide and narrow-angle groupings together without the HID light (11).

4. The headlamp of claim 1, wherein the narrow and wide-angle groupings are arranged in a circular pattern.

5. The headlamp of claim 1, wherein the wide-angle grouping comprises a circular arrangement of approximately 13 IR LEDs (14).

6. The headlamp of claim 1, wherein the IR LED narrow-angle beam grouping comprises a circular arrangement of approximately 13 IR LEDs (14).

7. The headlamp of claim 1, further comprising a retaining ring (12), wherein the IR LEDs (14) are affixed to the retaining ring (12), and the retaining ring (12) conducts heat generated by the IR LEDs (14) away from the IR LEDs.

8. The headlamp of claim 1, wherein each IR LED (14) arranged in the wide-angle grouping provides about a 120-degree beam pattern.

9. The headlamp of claim 1, wherein each IR LED (14) arranged in the narrow-angle grouping provides about a 7-degree beam pattern.

10. The headlamp of claim 1, wherein the housing (15) is a headlight canister readily adaptable for use in a tactical vehicle using the vehicle's existing wiring, mounting provisions, and switches.

* * * * *